US009690395B2

(12) United States Patent
Garfinkel et al.

(10) Patent No.: US 9,690,395 B2
(45) Date of Patent: Jun. 27, 2017

(54) DIGITIZER SYSTEM

(71) Applicant: Microsoft Technology Licensing, LLC, Redmond, WA (US)

(72) Inventors: Gadi Garfinkel, Yahud (IL); Eytan Mann, Modiln (IL); Arthur Gershfeld, Akko (IL); Shimon Nahear, Jerusalem (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 358 days.

(21) Appl. No.: 13/786,511

(22) Filed: Mar. 6, 2013

(65) Prior Publication Data

US 2013/0234961 A1 Sep. 12, 2013

Related U.S. Application Data

(60) Provisional application No. 61/607,037, filed on Mar. 6, 2012.

(51) Int. Cl.
*G06F 3/041* (2006.01)
*G06F 3/0354* (2013.01)
*G06F 3/044* (2006.01)

(52) U.S. Cl.
CPC .......... *G06F 3/03545* (2013.01); *G06F 3/041* (2013.01); *G06F 3/044* (2013.01); *G06F 3/0418* (2013.01)

(58) Field of Classification Search
None
See application file for complete search history.

(56) References Cited

U.S. PATENT DOCUMENTS 7,292,229 B2 * 11/2007 Morag et al. ................. 345/173
7,372,455 B2    5/2008 Perski et al.
7,973,771 B2 *  7/2011 Geaghan ....................... 345/173
(Continued)

FOREIGN PATENT DOCUMENTS

JP   05-173698       7/1993
WO   WO 2011/058562  5/2011

OTHER PUBLICATIONS

International Search Report and the Written Opinion Dated Jul. 1, 2013 From the International Searching Authority Re. Application No. PCT/IL2013/050198.

*Primary Examiner* — Jennifer Mehmood
*Assistant Examiner* — Stephen T Reed
(74) *Attorney, Agent, or Firm* — Miia Kati Janette Sula; Sergey Lamansky; Micky Minhas

(57) ABSTRACT

A digitizer system includes a designated sensing area comprising a plurality of sensing lines for sensing an electromagnetic signal emitted by a stylus, circuitry for detecting output from the plurality of sensing lines and for determining an interacting position of the stylus in the designated sensing area based on the output detected and a peripheral area contiguous to the designated sensing area. The peripheral area includes a plurality of conductive elements for connecting the sensing lines to the circuitry and at least one auxiliary sensing line extending over the peripheral area in the vicinity of the conductive elements and connected to the circuitry. The auxiliary sensing line senses the electromagnetic signal when it is emitted over the peripheral area and the circuitry detects output from the at least one auxiliary sensing line.

20 Claims, 3 Drawing Sheets

(56) References Cited

U.S. PATENT DOCUMENTS

| | | |
|---|---|---|
| 2005/0007351 A1 | 1/2005 | Fabrick, II |
| 2007/0227785 A1 | 10/2007 | Katsurahira |
| 2008/0128180 A1 | 6/2008 | Perski et al. |
| 2009/0078476 A1 | 3/2009 | Rimon et al. |
| 2010/0051356 A1 | 3/2010 | Stern et al. |
| 2010/0073325 A1* | 3/2010 | Yang .................... G06F 3/044 345/174 |
| 2011/0127092 A1* | 6/2011 | Lu ............................ 178/18.06 |
| 2012/0098759 A1* | 4/2012 | Chang ......................... 345/173 |
| 2012/0105362 A1* | 5/2012 | Kremin et al. ............... 345/174 |
| 2012/0154340 A1* | 6/2012 | Vuppu et al. ................ 345/179 |

* cited by examiner

DIGITIZER SYSTEM

RELATED APPLICATION

This application claims the benefit of priority under 35 USC §119(e) of U.S. Provisional Patent Application No. 61/607,037 filed Mar. 6, 2012. The contents of which are incorporated herein by reference in their entirety.

FIELD AND BACKGROUND OF THE INVENTION

The present invention, in some embodiments thereof, relates to a digitizer system and/or touch-screen and, more particularly, but not exclusively, to a digitizer system and/or touch-screen that supports stylus detection.

Digitizer systems are commonly used as input devices for a variety of electronic products and for a variety of different applications. Typically digitizer systems allow a user to provide free stylus input with a finger and/or stylus. Some digitizer systems are intended as a general replacement for a mouse as the primary pointing and navigation device for desktop computers.

A touch-screen is a digitizer system that is integrated with an electronic display screen. Touch-screens are often used for operating portable devices, such as Personal Digital Assistants (PDA), tablet Personal Computers (PCs), wireless flat panel displays (FPD) screens, laptop computers, smart phones and other devices. Touch-screens can be used for example to select virtual buttons displayed on the screen, to manipulate size and position of displayed objects, to enter data with a virtual keyboard, virtual number pad and/or by handwritten input, to open a document or application, to scroll within a window, to draw and/or to play games. Touch-screens typically support fingertip detection. Some touch screens additionally or alternatively support stylus detection.

Styluses may be particularly useful for applications that require touch detection with higher resolution such as drawing applications and/or applications that require handwritten input. Some applications are specifically geared toward receiving input from a stylus such as for example security applications that require a user to provide a handwritten signature. At times, usage of a stylus is a personal preference. Known styluses include passive styluses that may be powered by the electronic device and/or active styluses that may be battery powered.

U.S. Pat. No. 7,292,229 entitled "Transparent Digitiser," assigned to N-Trig Ltd., the content of which is incorporated herein by reference, describes a digitizer with an electronically refreshable display screen for user interaction via an object such as a stylus. The digitizer includes a transparent sensing arrangement of detectors located at the electronically refreshable display screen for detecting an electric field of the object while the object hovers over or touches the digitizer. The object such as the stylus includes a resonator arrangement that is energized in response to receiving an excitation signal from an excitation arrangement of the digitizer.

U.S. Pat. No. 7,372,455 entitled "Touch Detection for a Digitizer," assigned to N-Trig Ltd., the content of which is incorporated herein by reference describes a digitizer system including a grid of sensing conductors extending over a sensing area, a source of oscillating electrical energy at a predetermined frequency, and detection circuitry for detecting a capacitive influence on the sensing conductors when said oscillating electrical energy is applied, the capacitive influence being interpreted as a touch, e.g. fingertip touch. The digitizer system is advantageous in that the same sensing conductors can be used both for fingertip touch sensing and for detection of an electromagnetic stylus. Another advantage is that the digitizer system can distinguish between more than one fingertip and/or more than one stylus interacting with the digitizer system at the same time.

Japanese Patent Publication No. JP5173698 entitled "Coordinate Reader" describes a coordinate reading which computes a position on which an electromagnetic stylus was put based on a signal picked up by a sense line of the coordinate reader. The coordinate reader includes a plurality of sense lines each of which is formed with a loop coil and also includes a dedicated loop coil for noise detection. The dedicated loop coil for noise detection is shown to be positioned along one edge of the reader that is opposite an edge along which the sense lines connect to circuitry associated with the reader. A subtractor circuit in electrical communication with the sense lines and the dedicated loop coil for noise detection finds a difference between a signal derived from the sense line and a signal derived from the dedicated loop coil for noise detection. Consequently the noise component on the sense line can be removed.

SUMMARY OF THE INVENTION

According to an aspect of some embodiments of the present invention there is provided a digitizer system and method for reducing false positive stylus detection that occurs while a stylus is positioned near an edge of a digitizer sensor patterned with metal runners or the like for connecting the sensor to circuitry. Typically, the metal runners are densely patterned along one or more edges of the digitizer sensor and provide electrical communication between each of a plurality of sensing lines of the sensor and circuitry for determining a position of the stylus and/or other objects.

The present inventors have found that while a stylus is positioned near an edge of the sensor that includes metal runners, a signal emitted by the stylus can be picked up by one or more metal runners extending along that edge instead of and/or in addition to being picked up by sensing lines of the sensor. At times, the metal runners that pick up the stylus signal may be connected to sensor lines that are distanced and/or unrelated to a position of the stylus. The present inventors have found that since the stylus signal that is directly picked up by a metal runner cannot typically be distinguished from a stylus signal picked up sensing lines of the sensor, the additional and unintended input obtained by the metal runners may lead to false positive stylus detection.

According to some embodiments of the present invention, one or more auxiliary sensing lines are positioned along at least of a portion of a perimeter of the sensor patterned with metal runners and output from the auxiliary sensing line is monitored to determine when a user positions the stylus near the metal runners. According to some embodiments of the present invention, output from the auxiliary sensing line is compared with output obtained from the digitizer sensor to identify and exclude false positive stylus detection.

According to an aspect of some embodiments of the present invention there is provided a designated sensing area comprising a plurality of sensing lines for sensing an electromagnetic signal emitted by a stylus interacting with the digitizer system; circuitry for detecting output from the plurality of sensing lines and for determining an interacting position of the stylus in the designated sensing area based on the output detected; and a peripheral area contiguous to the designated sensing area, the peripheral area comprising: a plurality of conductive elements for connecting the plurality of sensing lines to the circuitry; and at least one auxiliary sensing line extending over the peripheral area in the vicinity of the plurality of conductive elements and connected to the circuitry, wherein the at least one auxiliary sensing line is operable to sense the electromagnetic signal when it is emitted over the peripheral area; and wherein the circuitry is operable to detect output from the at least one auxiliary sensing line.

Optionally, the circuitry is operative to identify when the electromagnetic signal is emitted over the peripheral area outside the designated sensing area, in response to the output detected on the at least one auxiliary sensing line.

Optionally, the at least one auxiliary sensing line and the plurality of conductive elements are patterned on a same surface.

Optionally, the at least one auxiliary sensing line and the plurality of conductive elements are patterned on different layers.

Optionally, the at least one auxiliary sensing line is formed from a same material as the sensing lines in the designated sensing area.

Optionally, the auxiliary sensing line is substantially parallel to a side of the designated sensing area.

Optionally, the peripheral area extends near two contiguous edges of the designated sensing area, and wherein the at least one auxiliary sensing area extends substantially parallel to the two contiguous edges of the designated sensing area.

Optionally, the at least one auxiliary sensing line is formed from a same material as the conductive elements for connecting each of the plurality of sensing lines to the circuitry.

Optionally, the at least one auxiliary sensing line is formed from at least one of: silver, Molybdenum, indium tin oxide, indium-doped zinc oxide, a conductive polymer, carbon nano-tube, metal nano-particles, metal, and antimony tin oxide.

Optionally, a first set of the plurality of sensing lines and a first auxiliary sensing line of the at least one auxiliary sensing line is patterned on a first layer and a second set of the plurality of sensing lines and a second auxiliary sensing line of the at least one auxiliary sensing line is patterned on a second layer, the second layer superimposed on the first layer.

According to an aspect of some embodiments of the present invention there is provided a method for determining an interacting position of a stylus with digitizer system, the method comprising: detecting a stylus signal received in a designated sensing area of a digitizer sensor; detecting a stylus signal received in a peripheral area contiguous to the designated sensing area, wherein the contiguous area includes a plurality of conductive elements for connecting the digitizer sensor to circuitry of the digitizer system; and determining the validity of the stylus signal received in the designated sensing area based on the input from the stylus in the area contiguous to the designated sensing area.

Optionally, the method includes only reporting the interaction position of the stylus in the designated sensing area in response to determining that the input from this stylus is valid.

Optionally, the method includes determining amplitude of the input from the stylus in the designated sensing area; determining amplitude of the input from the stylus in the peripheral area; and determining the validity of the input from the stylus in the designated sensing area based on a ratio between the amplitude in the designated sensing area and the amplitude in the peripheral area.

Optionally, the method includes determining a spread of the input from the stylus in the designated sensing area; and determining the validity of the input from the stylus in the designated sensing area based on the spread of the input.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS
OF THE INVENTION

The present invention, in some embodiments thereof, relates to a digitizer system and/or touch-screen and, more particularly, but not exclusively, to a digitizer system and/or touch-screen that supports stylus detection.

According to some embodiments of the present invention, a digitizer system includes a sensor formed from a plurality of sensing lines within a designated sensing area of the sensor and at least one additional auxiliary sensing line outside the designated sensing area and alongside and/or in the vicinity of conductive elements such as metal runners that connect the sensor to circuitry. According to some embodiments of the present invention, output from the sensing lines within the sensing area is detected simultaneously and/or substantially simultaneously with output from the auxiliary sensing line. In some exemplary embodiments, the auxiliary sensing line is operable to pick up a stylus signal while a stylus is positioned over or near the vicinity of the metal runners or like conductive elements.

According to some embodiments of the present invention, output obtained from the auxiliary sensing line provides indication that the stylus is transmitting nearby, e.g. is touching or hovering over the vicinity of the metal runners or like conductive elements. The present inventors have found that while the stylus is transmitting, e.g. by touch or hover over the vicinity of the metal runners, stylus signals can be picked up directly by the metal runners and these signals can be interpreted as signals sensed by the sensor over the designated sensing area. The present inventors have found that this may occur for example while a user performs a gesture and unintentionally continues the gesture outside the designated sensing area of the sensor.

According to some embodiments of the present invention, a processing unit included in the circuitry receives input from the auxiliary sensing line and uses the input to evaluate validity of input received from the sensing area via the metal runners. Optionally, both the frequency content as well as amplitude of the signal picked up by the auxiliary sensing line is considered. In some exemplary embodiments, the processing unit additionally examines input received from the sensing area of the sensor and/or previously recorded positions of the stylus for determining validity of input from the sensor. Optionally, the signal spread of stylus input received from the sensing area is examined to determine if the signal spread resembles an expected signal spread of a stylus signal. Typically, a stylus signal is expected to spread over a substantially circular or elliptic area that is substantially concentrated over 2-5 junctions in each dimension of the sensor, e.g. horizontal and vertical direction.

Figure 1:
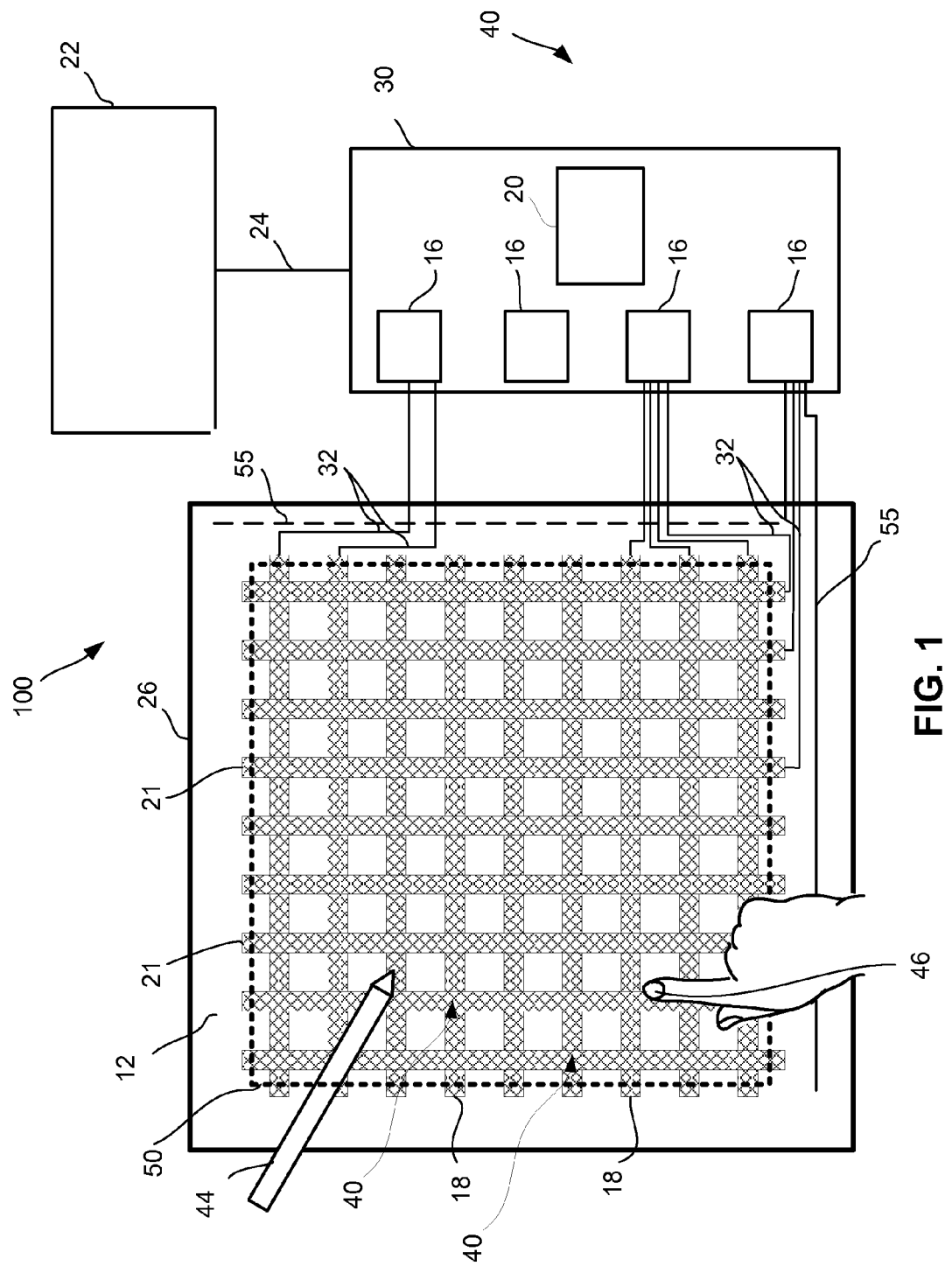
FIG. 1 is an exemplary simplified block diagram of a digitizer system in accordance with some embodiments of the present invention.

Reference is now made to FIG. 1 showing an exemplary simplified block diagram of a digitizer system in accordance with some embodiments of the present invention. According to some embodiments of the present invention, digitizer system 100 is suitable for any computing device that enables touch and/or hover input from a user to the device, e.g. mobile and/or desktop and/or tabletop computing devices that include, for example, FPD screens. Examples of such devices include Tablet PCs, pen enabled lap-top computers, tabletop computer, PDAs or any hand held devices such as palm pilots and mobile phones, or other devices that facilitate electronic gaming.

According to some embodiments of the present invention, digitizer system 100 includes a sensor 12 operative to sense input from one or more physical objects positioned over a designated sensing area 50 of sensor 12 and circuitry 40 electrically connected to sensor 12 for operating the sensor. Optionally, the physical objects sensed by sensor 12 include one or more of a stylus 44, a finger 46, a token, e.g. a conductive object and/or an electronic tag. Typically sensor 12 is formed from a plurality of sensing lines 18 and 21 spread over sensing area 50. Typically, input to sensing lines 18 and 21 by one or more physical objects is transmitted to circuitry 40 via a patterned arrangement of metal runners 32 that connect each of sensing lines 18 and 21 to circuitry 40. Optionally, circuitry 40 additionally functions to provide a triggering signal to one or more sensing lines 18 and 21 via metal runners 32 so that input from one or more fingertips and/or tokens can be detected by a mutual capacitance method.

According to some embodiments of the present invention, digitizer system 100 additionally includes one or more auxiliary sensing lines 55 patterned in peripheral area of sensor 12, e.g. outside sensing area 50 and in a vicinity of metal runners 32 and connected to circuitry 40. Optionally, one end of an auxiliary sensing line 55 is connected to circuitry 40 and another end is floated, e.g. not connected. Alternatively, an auxiliary sensing line 55 is connected to circuitry 40 at both ends. Optionally, an auxiliary sensing line 55 at least partially surrounds sensor 12. Typically, auxiliary sensing line 55 is electrically isolated from sensing lines 18 and 21 and from metal runners 32. Optionally, auxiliary sensing line 55 may be patterned between metal runners 32 and/or in an area immediately surrounding metal runners 32. Optionally, auxiliary sensing line 55 is patterned on a layer separated from some and/or all of metal runners 32. Optionally, in the case when auxiliary sensing line 55 is patterned on a layer separated from some and/or all of metal runners 32, auxiliary sensing line 55 crosses or overlaps at least some of metal runners 32. Typically, auxiliary sensing line 55 does not cross or overlap sensing lines 18 and 21.

In some exemplary embodiments, auxiliary sensing line 55 is formed and/or patterned with any of the following materials: silver, Molybdenum, ITO, indium-doped zinc oxide, a conductive polymer, carbon nano-tube, metal nano-particles, metal, antimony tin oxide or any other transparent or opaque conductive material. Optionally, auxiliary sensing line 55 is patterned from a same material as metal runners 32 and has similar dimensions and/or properties. For example, auxiliary sensing line 55 may have width of about 10 to about 50 micron, e.g. 20-30 micron. Alternatively, auxiliary sensing line 55 is patterned from a same material as the sensing lines 18 and 21 of sensor 12 and has similar dimensions and/or properties. In some embodiments, auxiliary sensing line 55 extends along substantially one or two dimensions of sensing area 50. Optionally, auxiliary sensing line 55 may substantially surround a perimeter of sensing area 50, e.g. each of its 4 edges. Optionally, auxiliary sensing line 55 is substantially parallel to edges of sensing area 50 and may have substantially the same dimensions as sensing area 50, e.g. formed from four edges, each having a length between 3.5 inches and 15 inches.

According to some embodiments of the present invention, sensor 12 is a mutual capacitance type sensor including row sensing lines 18 defining one axis of sensor 12 and column sensing lines 21 defining a second axis of sensor 12. Typically, sensing lines 18 and 21 are arranged in a grid pattern. It is appreciated that sensing lines 18 and 21 are typically densely patterned, however only a few sparsely patterned sensing lines 18 and 21 are shown for clarity purposes. In some exemplary embodiments, row sensing lines 18 are formed on one layer and/or surface of sensor 12 and column sensing lines 21 are formed on another layer and/or surface of sensor 12 so that the row and column sensing lines are electrically isolated from one another. Typically, the grid pattern forms junctions 40 in areas of overlap between row and column sensing lines. Typically, sensing lines 18 and 21 are formed from conductive material, e.g. copper, ITO and printed ink. In some exemplary embodiments, sensor 12 is transparent and overlaid on a FPD 26. Optionally, ITO is used to achieve transparency. In some exemplary embodiments, at least one auxiliary sensing line 55 is also patterned on one of the separate layers and/or surfaces of sensor 12, .e.g. at least one auxiliary sensing line 55 is patterned on a layer including sensing lines 18. Optionally at least one other auxiliary sensing line 55 may be patterned on a layer on a layer including sensing lines 21.

In some exemplary embodiments, row sensing lines 18 and column sensing lines 21 are formed on one layer and/or surface of sensor 12 and both metal runners 32 and auxiliary sensing line 55 are formed on the same layer as with sensing lines 18 and 21.

According to some embodiments of the present invention, circuitry 40 is provided on one or more PCB(s) 30 positioned in the vicinity of sensor 12. Typically PCB(s) 30 includes one or more Integrated Circuits (ICs) 16 connected to outputs of sensing lines 18 and 21 via metal runners 32 for processing input received by sensing lines 18 and 21 and/or for transmitting a triggering signal on one or more sensing lines 18 and 21. It will be appreciated that although only a few metal runners 32 are shown, each of sensing lines 18 and 21 is connected by a metal runner to one or more ICs 16.

Typically, only one end of each sensing line 18 and 21 is connected to circuitry 40, e.g. IC 16. However, in some embodiments of the present invention both ends of some or all of sensing lines 18 and/or sensing lines 21 may be connected to circuitry 40. According to some embodiments, metal runners 32 are patterned around one or more edges of sensor 12 and outside a designated sensing area 50 of sensor 12, e.g. under a frame of FPD 26. It is appreciated that an area between sensing area 50 and a perimeter of FPD 26 is exaggerated here for illustrative purposes. Typically, it is desired that the area including the metal runners and auxiliary sensing lines 55 and/or a frame of an FPD is relatively small and/or narrow.

Typically, metal runners 32 connecting sensing lines 18 to circuitry 40 are formed on a same layer and/or surface as sensing lines 18, and metal runners 32 connecting sensing lines 21 to circuitry 40 are formed on a same layer and/or surface as sensing lines 21. Alternatively, metal runners 32 are formed on a single layer. Due to the space limitations, metal runners 32 may be densely packed. Optionally, when metal runners are formed on two separate layers, metal runners from different layers may overlap and/or cross each other. It will be further appreciated that metal runners connected to conductive elements of one set, may run in parallel to a conductive line of the other set. For example, metal runners connected to the vertical sensing lines 21 of sensor 12 may run in parallel to horizontal sensing lines 18.

According to some embodiments of the present invention, circuitry 40 includes one or more ICs 16 that function to process signals received from sensing lines 18, 21 and 55 and to sample the sensor's output into a digital representation. In some exemplary embodiments, output from sensing lines 18, 21 and 55 are sampled substantially simultaneously. In some exemplary embodiments, circuitry 40 additionally includes a digital unit 20, e.g. digital IC unit also on PCB 30, for further digital processing. According to some embodiments of the present invention, digital unit 20 together with ICs 16 serve as the controller of the digitizer system and/or has functionality of a controller and/or processor.

According to some embodiments of the invention, digital unit 20 receives the sampled data from ICs 16, reads the sampled data, processes it and determines and/or tracks the position of one or more physical objects, e.g. stylus 44, token 45, finger 46, and/or an electronic tag touching the digitizer sensor from the received and processed signals. According to some embodiments of the present invention, digital unit 20 processes input received from auxiliary sensing line 55 to determine validity and/or reliability of input received from sensor 12. In some exemplary embodiments of hovering of an object, e.g. stylus 44, finger 46 and hand, is also detected and processed by digital unit 20. Calculated position and/or tracking information are reported to host computer 22 via interface 24. Optionally output from digital unit 20 is further processed by the operating system or any current application.

According to some embodiments of the present invention, digital unit 20 together with ICs 16 includes memory and/or memory capability. Memory capability may include volatile and/or non-volatile memory, e.g. FLASH memory. In some embodiments of the present invention, the memory unit and/or memory capability, e.g. FLASH memory is a unit separate from digital unit 20 but in communication with digital unit 20. According to some embodiments of the present invention, one or more tables and/or databases may be stored to record statistical data and/or outputs, e.g. images or patterned outputs of sensor 12, sampled by ICs 16 and/or calculated by digital unit 20. Data and/or signal values may be stored in volatile and nonvolatile memory. According to some embodiments of the present invention digitizer 100 is operable to detect simultaneous touches (including hovering) of one or more styluses, one or more fingertips, one or more tokens and/or one or more electronic tags. Optionally, when more than one styluses simultaneously interact with digitizer system 100, the styluses can be differentiated from each other based on the signal emitted by each stylus.

It will be appreciated that digital unit 20 and any one or more of ICs 16 may be implemented as a single component that samples the sensor lines and processes the data. This single component can be implemented as an analog and digital mixed single chip.

A digitizer system similar to digitizer system 100 is described with further details, for example in incorporated U.S. Pat. Nos. 7,372,455 and 7,292,229. It is appreciated that the present invention is not to be limited to the technical description of the digitizer system and methods for detection described herein. The present invention may also be applicable to other digitizer systems depending on their construction and/or to other methods for detection with a touch screen.

Stylus 44 can include any of a number or type of styluses, e.g. active or passive styluses that emit an electromagnetic signal that can be picked up by a digitizer system and may be similar to styluses described, for example in incorporated U.S. Pat. No. 7,292,229 and also in U.S. Patent Application Publication No. 20080128180, entitled "Position Detecting System and Apparatuses and Methods for Use and Control Thereof," U.S. Patent Application Publication No. 20090078476, entitled "Method for Identifying Changes in Signal Frequencies Emitted by a Stylus interacting with a Digitizer Sensor," and U.S. Patent Application Publication No. 20100051356, entitled "Pressure Sensitive Stylus for a Digitizer," all of which are incorporated herein by reference.

Figure 2:
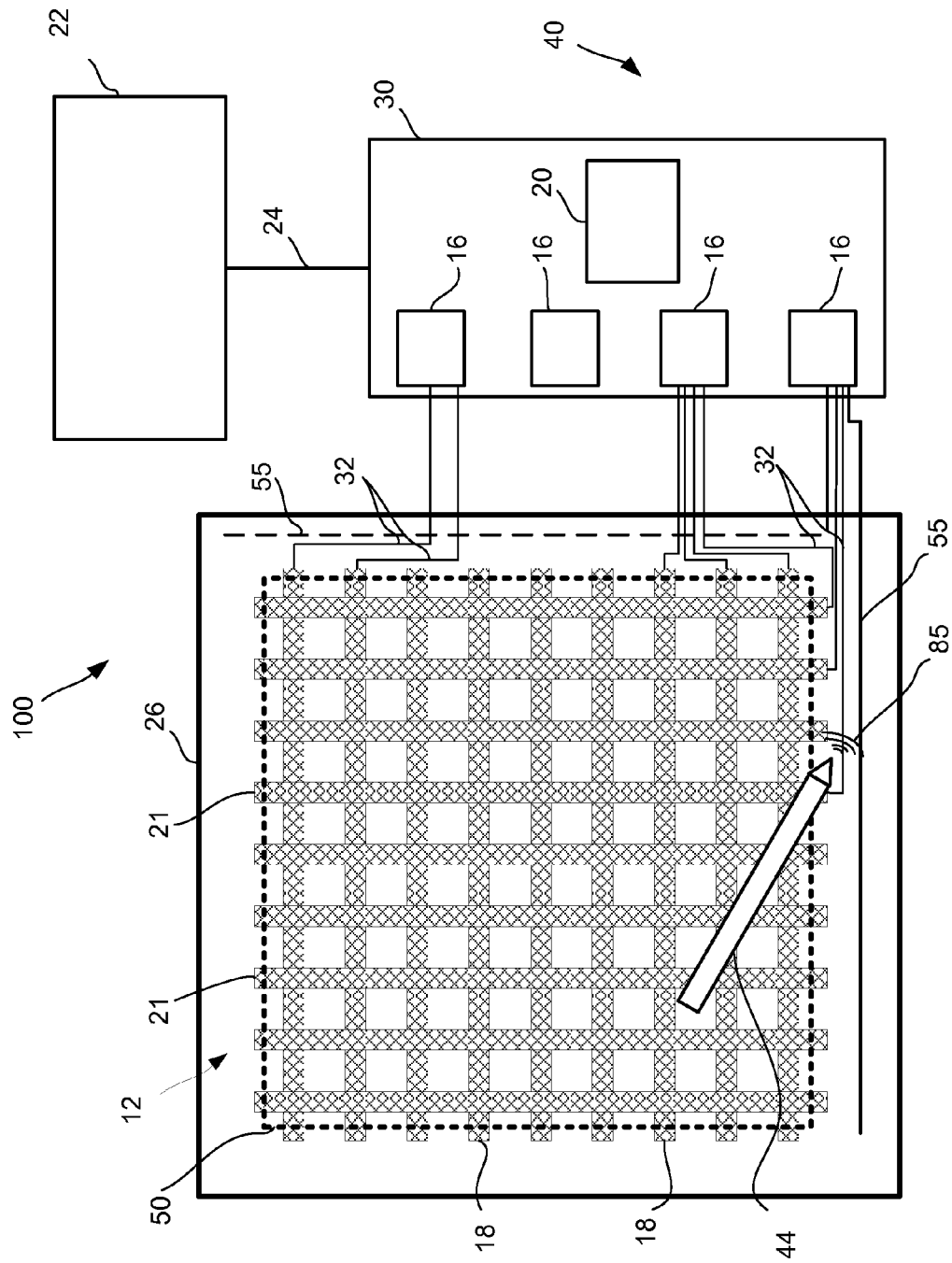
FIG. 2 is an exemplary simplified block diagram of the digitizer system operated with a stylus in accordance with some embodiments of the present invention.

Reference is now made to FIG. 2, showing a digitizer system operated with a stylus in accordance with some embodiments of the present invention. According to some embodiments of the present invention, digitizer system 100 is operated with a stylus 44 that emits a signal 85 to be picked up by one or more of sensing lines 18 and/or 21. Typically, while stylus 44 is positioned within sensing area 50, signal 85 is detected over a spread of plurality of contiguous junctions forming a substantially circular, elliptic, and/or rectangular area including 2-5 junctions along each axis of sensor 12.

However, once stylus 44 positioned near an area patterned with metal runners 32, signal 85 can also be picked by one or more nearby metal runners 32. Optionally, depending on the position of stylus 44, signal 85 may only be picked up by nearby metal runners 32. Metal runners 32 picking up signals from stylus 44 may be connected to sensing lines 18 and/or 21 that are distanced and/or unrelated to position of stylus 44. The present inventors have found that signals 85 picked up by metal runners 32 can lead to false positive detection and/or to nonsensical output.

For example, in response to stylus 44 emitting a signal near metal runners 32, the present inventors have found that a plurality of different reports providing location of stylus 44 over sensing area 50 may be generated by circuitry 40. In some cases one or all of the position reports may be unrelated to an actual position of stylus 44. In another example, in response to stylus 44 emitting a signal near metal runners 32, circuitry 40 may determine that a stylus signal was received over an oblong area, e.g. an area covered by a plurality of consecutive junctions along a single axis of sensor 12. The oblong area may or may not be related to the actual position of stylus 44.

The present inventors have found that while signal 85 emitted by stylus 44 can be picked up by metal runners 32, a fingertip touching and/or hovering near metal runners 32 will not typically be sensed by the metal runners due to the narrow dimensions of the metal runners which do not enable capacitive coupling with the fingertip. In addition, a stylus signal emitted well within the designated sensing area will typically not be picked up by the metal runners.

According to some embodiments of the present invention, auxiliary sensing lines 55 are patterned close to metal runners 32 so that signals picked up a metal runner 32 it will also be picked up by at least one auxiliary sensing line 55. According to some embodiments of the present invention, auxiliary sensing lines 55 are sampled substantially simultaneously with sensing lines 18 and 21 and monitored to determine when a stylus is emitting a signal in the vicinity of metal runners 32. Optionally, a position of stylus 44 is not processed and/or reported to host 22 over one or more sampling periods in response to determining that the input received by the stylus is not reliable due to the stylus' proximity to metal runners 32 at the time of detection.

It will be appreciated that additional factors may be taken into account when determining whether to process and/or report a position of the stylus to host 22. In some exemplary embodiments, an amplitude level and/or frequency content of a signal picked up by auxiliary sensing line 55 is examined. Optionally, frequency content analysis is used to identify a specific stylus that is emitting outside sensor area 50. Optionally if other styluses, fingertips, tokens and/or tags are simultaneously interacting with digitizer 100, only the stylus emitting outside of sensing area 50 may be ignored, while positions of other objects are reported.

In some exemplary embodiments, amplitude level of a signal obtained from auxiliary sensing line 55, e.g. amplitude in a defined frequency range is compared to amplitude level obtained from sensing lines 18 and 21 that are close to auxiliary conductor 55. Optionally, if the amplitude of the signal obtained from auxiliary sensing line 55 is low and/or significantly lower than amplitude of same signal in sensing lines 18 and/or 21, output obtained from sensor 12 may be considered reliable and the stylus position may be reported.

Alternatively or additionally, a spread signal 85 in sensing area 50 may be used for determining whether to process and/or report a position of the stylus to host 22. For example a concentrated spread over 2-5 junctions in each dimension of sensor 12, may provide indication that the input received from stylus 44 is reliable and can be used to determine position of the stylus, while an oblong spread over substantially one dimension of sensor 12 may provide indication that that input from stylus 44 is not reliable. It will be appreciated that other criteria and algorithms as described herein may be applied in combination when determining whether to process and/or report a position of the stylus to host 22.

In some exemplary embodiments, one or more of metal runners 32 are operated as auxiliary line 55, instead of adding an additional line. In such embodiments, a sensing line 18 or 21 connected to the metal runner will not be used to detect touch or hover in sensing area 50.

Figure 3:
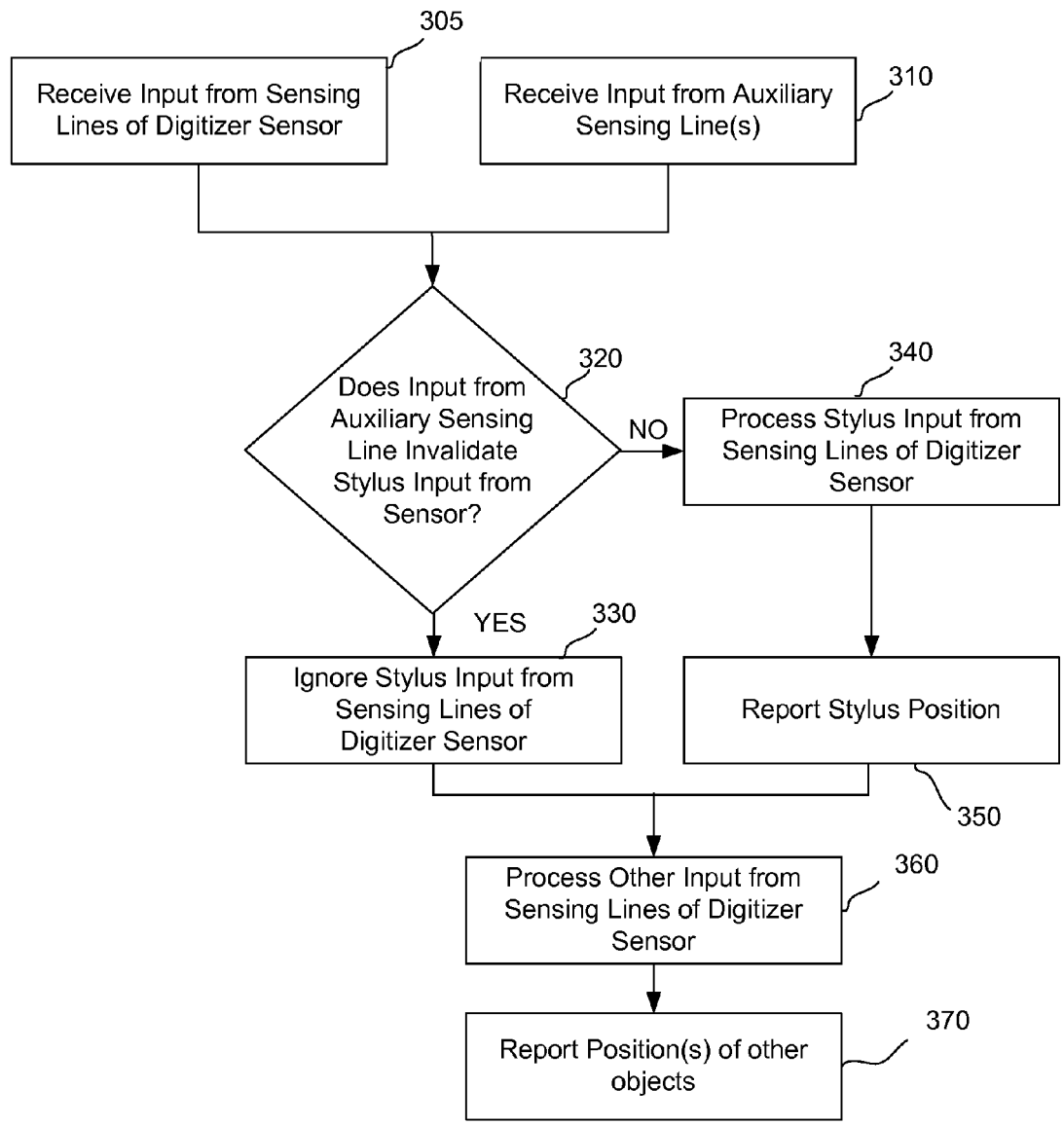
FIG. 3 is a simplified flow chart of an exemplary method for verifying validity of output from stylus as obtained from the digitizer system in accordance with some embodiments of the present invention.

Reference is now made to FIG. 3 showing a simplified flow chart of an exemplary method for verifying validity of output obtained from stylus in accordance with some embodiments of the present invention. According to some embodiments of the present invention, circuitry associated with a digitizer sensor senses input from sensing lines within a designated sensing area of the digitizer sensor (block 305) and also from an auxiliary sensing line positioned outside and/or along a perimeter of the designated sensing area (block 310). Typically, both inputs are sensed over a single refresh cycle and/or substantially simultaneously. According to some embodiments of the present invention, input received from the digitizer sensor and from the auxiliary sensing line is examined to determine if input obtained from a stylus should be invalidated (block 320). Typically, the stylus signal is invalidated, not processed and/or not reported when it is determined that that the stylus is positioned substantially close to the metal runners and/or outside the designated sensing area.

According to some embodiments of the present invention, in response to detecting a stylus signal on the auxiliary sensing line, input from the stylus on the digitizer sensor is ignored (block 330) and a stylus position is not reported to a host computer over that refresh cycle. Optionally, the stylus signal is only ignored in response to receiving a signal on the auxiliary sensing line with amplitude above a predefined threshold, e.g. in a frequency emitted by the stylus. Optionally, additional parameters are examined prior to invalidating input from the stylus. Optionally, one or more ratios between amplitude of the stylus signal obtained from the auxiliary sensing line and amplitude of the stylus signal obtained from one or more sensing lines of the sensor are compared to a threshold. Optionally, the input from the stylus is invalidated when the amplitude threshold and/or the ratio threshold is exceeded. Optionally, output from the stylus is processed and a spread of stylus location for the sensor is examined to determine if the spread resembles an expected spread as described herein.

Optionally, tracking information, e.g. previous positions of the stylus are examined and compared to positions as can be determined from the output of the sensor and output of the auxiliary sensing line.

According to some embodiments of the present invention, if it is determined that the input obtained from auxiliary line does not provide indication that the input received from the stylus should be invalidated, the stylus input is processed (block 340) and the stylus position is reported (350). According to some embodiments of the present invention, input from other objects such as fingertip interaction, interactions of other styluses and/or tokens are processed (block 360) and their positions are reported (block 370).

It is appreciated that the same or similar system and methods described herein are not limited to mutual capacitance based digitizer systems and can also be applied to other digitizer systems supporting stylus detection.

It is appreciated that the same or similar system and methods described herein can be applied for reducing various types of noises, or for reducing false positive detection of other objects that emit electromagnetic signals that can be picked up by a digitizer system, e.g. game pieces.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a sensor line" or "at least one sensor" may include a plurality of sensor lines.

Throughout this application, various embodiments of this invention may be presented in a range format. It should be understood that the description in range format is merely for convenience and brevity and should not be construed as an inflexible limitation on the scope of the invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A digitizer system comprising:
    a digitizer sensor configured to pick up an electromagnetic signal emitted by a stylus, the digitizer sensor comprising:
        a designated sensing area comprising a sensing grid defining junctions; and
        a peripheral area comprising:
            a plurality of conductive elements configured to connect the sensing grid to a circuit; and
            at least one auxiliary sensing line extending over the peripheral area in the vicinity of the plurality of conductive elements and connected to the circuit; and
    the circuit, wherein the circuit is configured to:
        detect first outputs from the sensing grid via the plurality of conductive elements;
        identify, from the first outputs, first junctions in the sensing grid that appear to be picking up the electromagnetic signal emitted by the stylus;
        detect a second output from the at least one auxiliary sensing line; and
        report an interaction position of the stylus based on the first outputs as long as the number of the first junctions along at least one axis of the sensing grid is below a defined threshold number of junctions and amplitude of the second output is below a defined amplitude threshold.

2. The digitizer system of claim 1, wherein the at least one auxiliary sensing line and the sensing grid are patterned on a same surface.

3. The digitizer system of claim 1, wherein the at least one auxiliary sensing line and the sensing grid are patterned on different layers.

4. The digitizer system of claim 1, wherein the at least one auxiliary sensing line is formed from a same material as the sensing grid.

5. The digitizer system of claim 1, wherein the auxiliary sensing line is substantially parallel to a side of the designated sensing area.

6. The digitizer system of claim 1, wherein the peripheral area extends near two contiguous edges of the designated sensing area, and wherein the at least one auxiliary sensing area extends substantially parallel to the two contiguous edges of the designated sensing area.

7. The digitizer system of claim 1, wherein the at least one auxiliary sensing line is formed from a same material as the plurality of conductive elements.

8. The digitizer system of claim 1, wherein the at least one auxiliary sensing line is formed from at least one of: silver, Molibdenum, indium tin oxide, indium-doped zinc oxide, a conductive polymer, carbon nano-tube, metal nano-particles, metal, and antimony tin oxide.

9. The digitizer system of claim 1, wherein the sensing grid includes a first set of sensing lines and a second set of sensing lines and wherein a first set of sensing lines and a first auxiliary sensing line of the at least one auxiliary sensing line is patterned on a first layer and a second set of the plurality of sensing lines and a second auxiliary sensing line of the at least one auxiliary sensing line is patterned on a second layer, the second layer superimposed on the first layer.

10. A method comprising:
    detecting first outputs from a digitizer sensor comprising a designated sensing area and a peripheral area, the designated sensing area comprising a sensing grid defining junctions and the peripheral area comprising a plurality of conductive elements configured to connect the sensing grid to a circuit and at least one auxiliary sensing line in the vicinity of the plurality of conductive elements;
    identifying, from the first outputs, first junctions in the in the grid that appear to be picking up the electromagnetic signal emitted by the stylus;
    detecting a second output from the at least one auxiliary sensing line; and
    reporting an interaction position of the stylus from the first outputs as long the number of the first junctions along at least one axis of the sensing grid is below a defined threshold number of junctions and amplitude of the second output is below a defined amplitude threshold.

11. The method according to claim 10, comprising refraining from reporting the interaction position of the stylus based on determining that the first outputs were detected while the stylus was directly coupling with the conductive elements.

12. The method according to claim 10, comprising:
    determining amplitude of the electromagnetic signal received in the designated sensing area;
    determining amplitude of the electromagnetic signal received in the peripheral area; and
    determining validity of the identified first junctions in the designated sensing area based on a ratio between the amplitude in the designated sensing area and the amplitude in the peripheral area.

13. The method according to claim 10, comprising:
    determining a spread of the identified first junctions in the designated sensing area; and
    determining the validity of the identified first junctions based on the spread.

14. The method of claim 10 comprising tracking interaction positions of the stylus over time and determining the validity based on distances between the interaction positions.

15. A digitizer system comprising:
    a digitizer sensor configured to pick up an electromagnetic signal emitted by a stylus, the digitizer sensor comprising:
        a designated sensing area comprising a sensing grid defining junctions; and
        a peripheral area comprising:
            a plurality of conductive elements configured to connect the sensing grid to a circuit; and at least one auxiliary sensing line extending over the peripheral area in the vicinity of the plurality of conductive elements and connected to the circuit; and the circuit, wherein the circuit is configured to:
  detect first outputs from the sensing grid via the plurality of conductive elements;
  identify, from the first outputs, first junctions in the sensing grid that appear to be picking up the electromagnetic signal emitted by the stylus and shape of an interaction area defined by spread of the first junctions;
  detect a second output from the at least one auxiliary sensing line;
  report an interaction position of the stylus from the first outputs as long as amplitude of the second output is below a defined amplitude threshold and a parameter defining the shape of the interaction area indicates a circular, elliptical or rectangular shape; and
  refrain from reporting an interaction position of the stylus as long as the amplitude of the second output is above the defined amplitude threshold or the parameter defining the shape of the interaction area does not indicate the circular or the elliptical shape.

16. The device of claim 15, wherein the at least one auxiliary sensing line and the sensing grid are patterned on a same surface.

17. The device of claim 15, wherein the at least one auxiliary sensing line is formed from a same material as the sensing grid.

18. The device of claim 15, wherein the at least one auxiliary sensing line is formed from a same material as the conductive elements for connecting each of the plurality of sensing lines to the circuitry.

19. The digitizer system of claim 15, wherein the at least one auxiliary sensing line and the sensing grid are patterned on different layers.

20. The digitizer system of claim 15, wherein the first junctions are determined to be a result of direct coupling of the stylus with the conductive elements based on a ratio between amplitude of the first outputs and the amplitude of the second output.

* * * * *